United States Patent [19]

McLain et al.

[11] Patent Number: 4,905,434
[45] Date of Patent: * Mar. 6, 1990

[54] ALIGNING AND COUPLING MEANS FOR TRENCHDUCT

[75] Inventors: Michael J. McLain, Monona, Wi.; Timothy S. Bowman, Parkersburg, WV.

[73] Assignee: Butler Manufacturing Company, Kansas City, Mo.

[*] Notice: The portion of the term of this patent subsequent to Jan. 20, 2004 has been disclaimed.

[21] Appl. No.: 9,699

[22] Filed: Jan. 12, 1987

Related U.S. Application Data

[62] Division of Ser. No. 621,957, Jun. 18, 1984, Pat. No. 4,637,185.

[51] Int. Cl.$^4$ .............................................. E04B 5/48
[52] U.S. Cl. ....................................... 52/221; 174/48; 403/405.1; 220/3.4
[58] Field of Search ................... 52/220, 221, 126.2, 52/396; 174/48, 49, 96, 98, 101; 220/3.4, 3.7, 3.8; 403/405.1, 406, 407

[56] References Cited

U.S. PATENT DOCUMENTS

| | | | |
|---|---|---|---|
| 3,204,378 | 9/1965 | Stesser et al. | 52/221 X |
| 3,593,472 | 7/1971 | Bargar | 52/221 |
| 3,701,837 | 10/1972 | Fork | 52/221 X |
| 3,886,702 | 6/1975 | Fork | 52/221 |
| 4,040,755 | 8/1977 | Jorgensen et al. | 52/221 |
| 4,173,382 | 11/1979 | Booty | 174/48 X |
| 4,420,091 | 12/1983 | Thorpe et al. | 220/3.7 |
| 4,637,185 | 1/1987 | Bowman | 52/221 |

Primary Examiner—Richard E. Chilcot, Jr.
Attorney, Agent, or Firm—Frederick J. Olsson

[57] ABSTRACT

A trench duct side rail having an upper section and a lower section, the upper section including a pair of spaced-apart downwardly extending legs and with the lower section being disposed between the legs. The upper and lower sections are axially off-set so that on one end of the side rail the upper section extends outwardly of the lower section and on the opposite end of the side rail the upper section extends inwardly of the lower section.

3 Claims, 3 Drawing Sheets

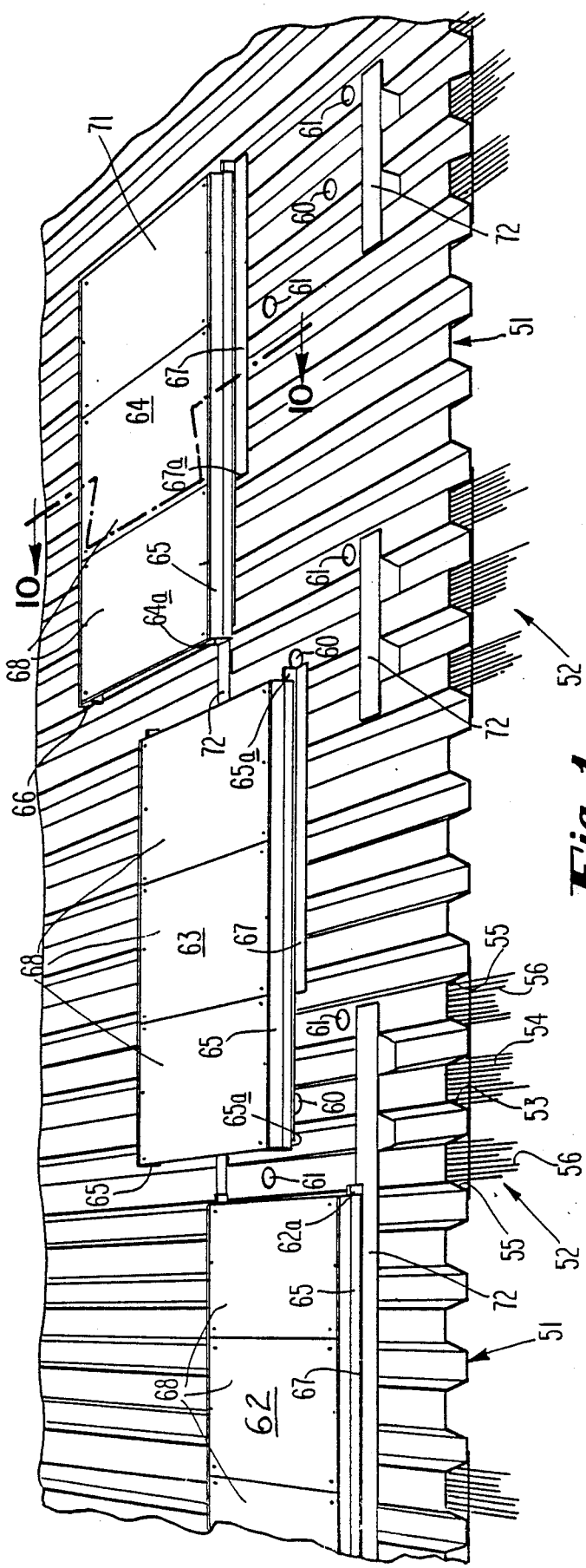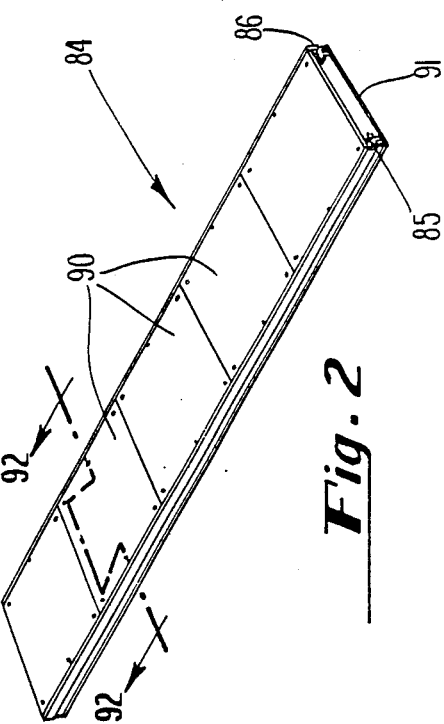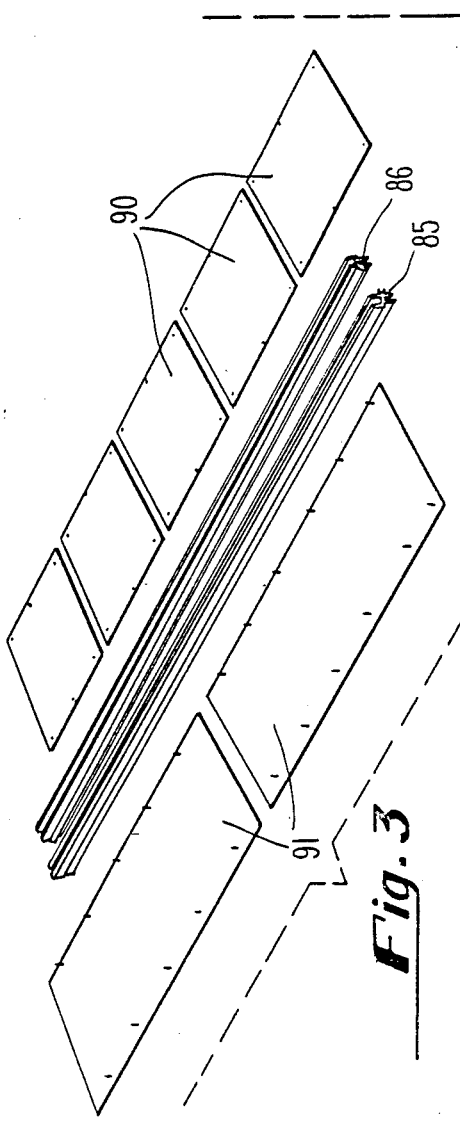

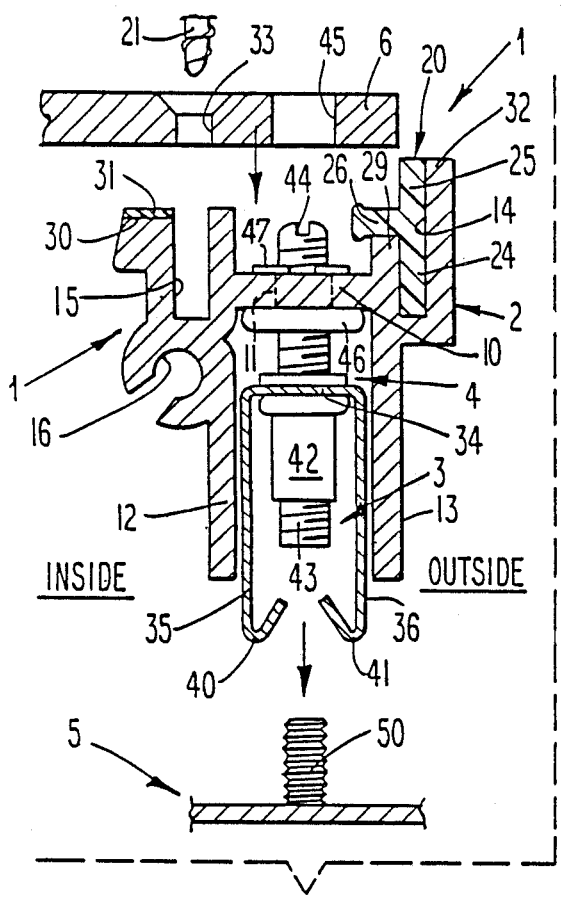
Fig. 4
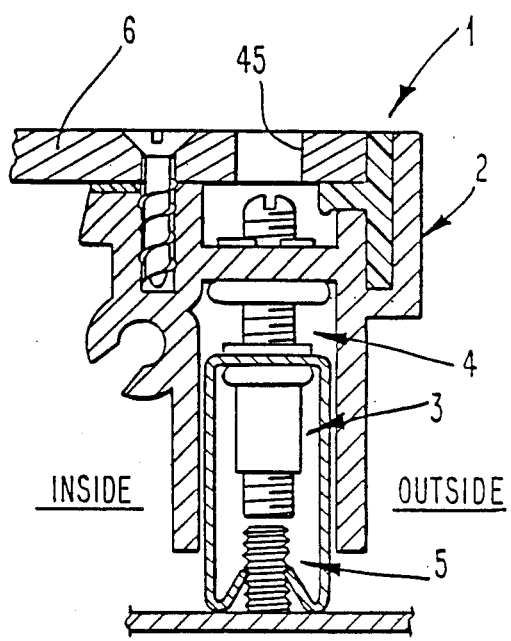
Fig. 5
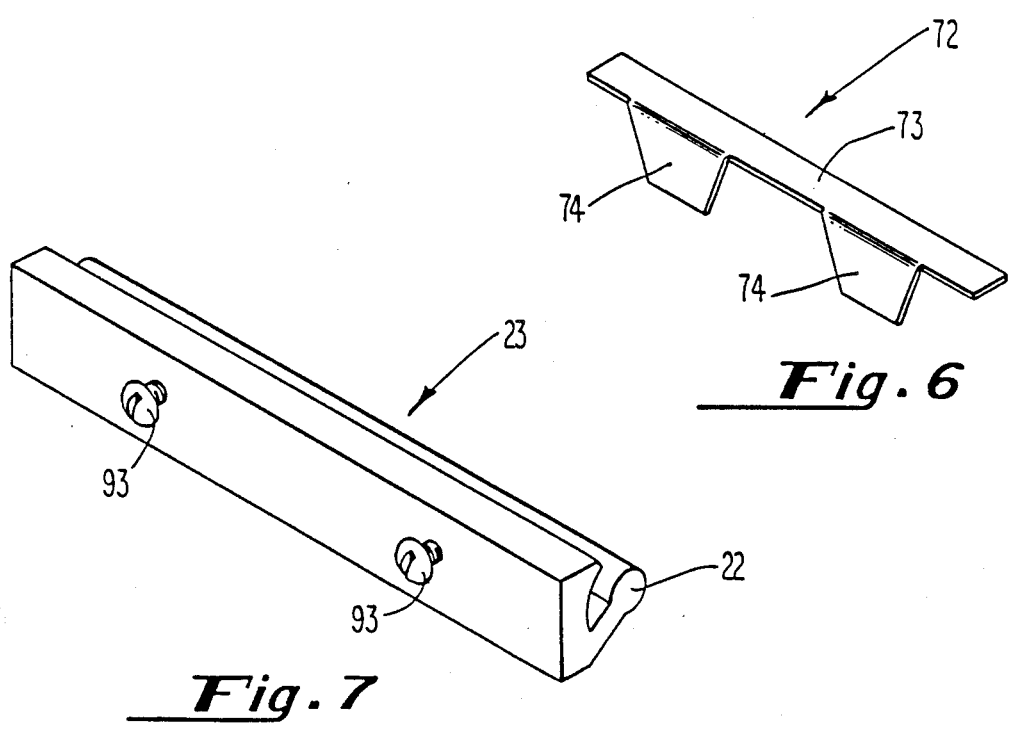
Fig. 6
Fig. 7

ALIGNING AND COUPLING MEANS FOR TRENCHDUCT

This application is a division of application Ser. No. 621,957 filed June 18, 1984, now U.S. Pat. No. 4,637,185.

This invention relates to underfloor electrical distribution systems for buildings and more particularly relates to improvements in trenchducts embedded in concrete floors wherein the subfloor is either metal or concrete.

The invention contemplates means on a trenchduct section for use in aligning the section as it is being placed down on a desk adjacent to a section already in place and having the same aligning means and also for use, when in place, to couple the adjacent trench sections together.

The invention will be explained in connection with the trench shown in the above identified application.

FIG. 1 is a perspective, exploded view illustrating intermittent bottom trench incorporating the invention being installed on a metal subfloor having cellular raceways;

FIG. 2 is a perspective view of an assembled, full-bottom pan trench;

FIG. 3 is a view illustrating component parts selected from a warehouse inventory to be assembled into the trench of FIG. 2;

FIG. 4 is a cross sectional, exploded elevational view of the side rail and plate mechanism of the trench of FIG. 1;

FIG. 5 is a cross sectional view of the components of FIG. 4 assembled together;

FIG. 6 is a perspective view of a valley closure used with intermittent bottom trench;

FIG. 7 is a perspective view of a coupler used to couple or align abutting ends of adjacent side rails;

Figure 10:
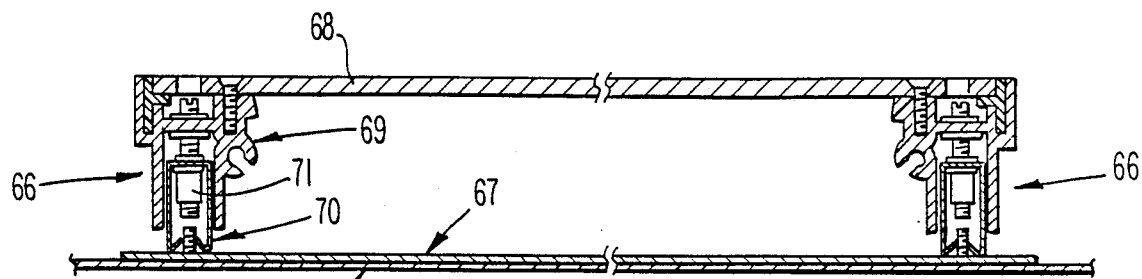
Figure 11:
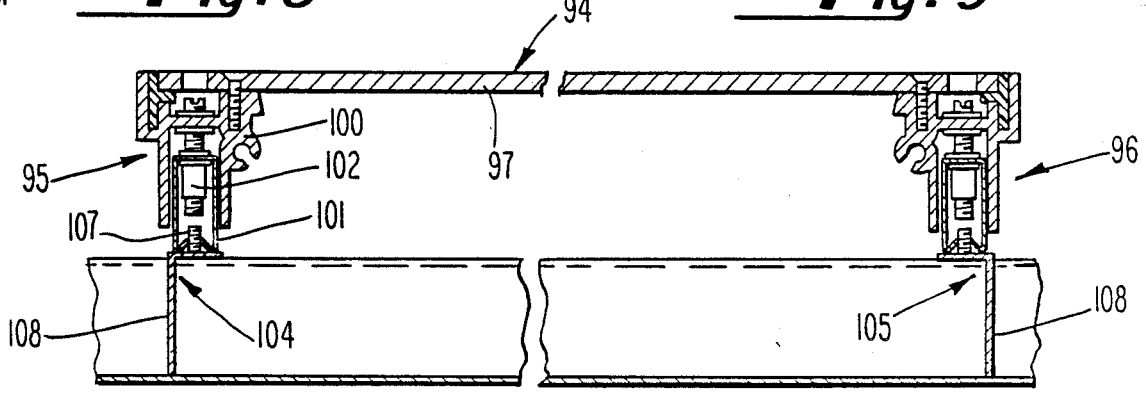

FIG. 10 a cross sectional elevational view of an intermediate bottom or pan trench as taken along the lines 10—10 of FIG. 1;

FIG. 11 is a cross sectional elevational view of a bottomless trench; and

Figure 12:
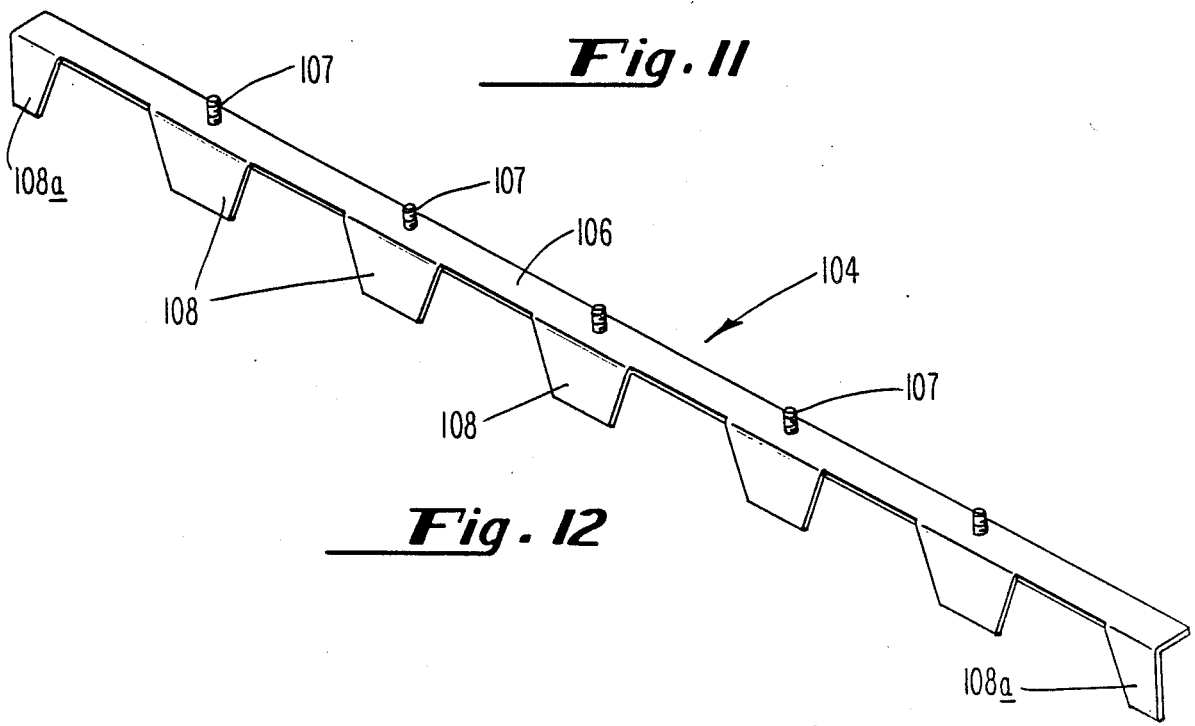

FIG. 12 is a perspective view of the plate mechanism for bottomless trench.

Before proceeding with the description, the conventional meaning or significance of various terms will be commented on.

It will be understood that the term "trench" as used herein is synonomous with the terms "trench duct" and "trench header" and similar descriptive names used in the trade. Also, it will be understood that the term metal subfloor is inclusive of both corrugated and cellular decking both of which, of course, have crests and valleys. Further, it is pointed out that the "bottom" of a trench is sometimes referred to in the trade as the "pan" and full bottom trenches are sometimes called "pan trenches".

A full bottom or pan trench refers to a trench where the bottom is co-extensive with the length of the side rails and extends transversly between the side rails. Normally the bottom has three openings which align with corresponding openings in the crests of the power and communication ducts or cells in the cellular raceway.

An intermittent bottom trench is a pan trench where the bottom extends transversly between the side rails but does not extend the full length of the side rails. The effect of this is that the normal three access openings of the pan are thus enlarged to create a single opening which extends transversely between the side rails and lengthwise a distance equal to the cellular raceway. This opening provides access to openings in the crests of the power and communication ducts or cells of cellular raceway.

A bottomless trench is a pan trench wherein the three access openings have been infinitely enlarged; i.e. to extend between the side rails and for the full length of the side rails. The effect of this is to completely eliminate the bottom of the trench. The bottom is created by the crests of the subfloor and cellular raceway.

The drawings havein illustrate the trenches of the invention in connection with metal subfloors. In this regard it will be understood that all three types are employed over metal subfloors and that pan or full bottom trenches and bottomless trenches are also employed over concrete subfloors.

The nature of the full bottom, intermittent bottom, and bottomless trenches of the invention and the assembly of same either in the factory or in the field will readily be more appreciated by first describing the preferred structure of the side rails and the plate mechanism.

Referring to FIG. 4, the side rail 1 comprises an elongated upper section 2 and an elongated lower section 3 which are joined together by several spaced-apart adjusting mechanisms one of which is noted at 4. As seen in FIG. 4, the side rail 1 is directly mounted on the plate mechanism 5. The upper section 2 is preferably an aluminum extrusion and the lower section 3 is preferably fabricated from sheet metal. Extrusion and fabricating techniques are conventional.

A trench cover 6 is supported on top of the side rail. When mounted in a floor, the side rail extends horizontally and the cover is flush with the floor surface.

In the cross section shown in FIGS. 4 and 5, the area on the left hand side is on the inside of the trench and this is labelled "INSIDE" while the area on the right-hand side is on the outside of the trench and is labelled "OUTSIDE".

The horizontally extending upper section 2 has an upper bridge 10 having a plurality of clearance openings serially spaced along the same, one of which is indicated at 11. Extending down from the bridge are a pair of spaced apart upper legs 12 and 13. The upper section 2 is formed with three slots 14, 15, and 16. These slots respectively receive a reversible tile trim 20, a cover hold down screw 21, and a key arm 22 of a coupler 23 shown in FIG. 7.

The reversible tile trim 20 has oppositely directed arms 24 and 25 and an intermediate leg 26 normal thereto. The tile trim slot 14 is adapted to receive either of the arms 24 or 25 and in both cases the leg 26 engages the abutment 29 and serves as gasket means for the cover 6. Adajcent the cover hold-down slot 14 is an abutment 30 for a cover gasket 31. The gasket 31 is employed where additional edge support for the cover is desired.

When the arm 24 is in the slot 14, the arm 25 is flush with the egde 32 and the surface of the cover 6 and this adapts the trench for carpet floor covering. When the arm 25 is in the slot 14, the arm 24 extends above the top edge 32 and surface cover 6 and functions as a tile trim in tile types of floor covering.

The cover hold down screw 21 extends through a countersunk clearance opening 33 in the cover 6 and into the slot 15 when the threads self-tap into the walls of the slot. With respect to the coupler slot 16, this serves as a keyway for the key arm 22 when the coupler 23 is used to align abutting trenches as noted later on.

The horizontally extending lower section 3 has a lower bridge 34 which is disposed below the upper bridge 10 and extends parallel to same. Extending down from the lower bridge 34 are a pair of spaced apart lower legs 35 and 36 which are closely adjacent the upper legs 12 and 13. The lower leg 35 terminates in an inwardly extending bend 40 and the lower leg 36 terminates in an inwardly extending bend 41. The bends 40 and 41 face one another and form a connector or stud gripping means.

The lower bridge 34 carries a plurality of adjusting nuts which are serially spaced along the bidge one of which is indicated at 42. The nut shown in a conventional type called a RIV-NUT and has upset portions which secure the nut in position.

The adjusting nuts carry adjusting screws and the screw for the nut 42 being indicated at 43. These screws extend upwardly through the clearance holes 11 and at the top end are slotted at 44 to receive a turning tool inserted through access holes in the cover such as the access hole 45 for the screw 43. Each screw has a support flange such as the support flange 46 for the screw 43. Each support flange engages the underside of the upper bridge 10 and thereby supports the upper section 2 on the lower section 3.

The upper bridge 10 is held firm against the support flange by the conventional keyhole spring clips such as the clip 47 which fits into peripheral slots in the screw and bear on the top of the bridge 10.

As will be apparent, the upper section 1 can be moved vertically with respect to the lower section as by turning the adjusting screws. The adjacent provision, of course, is for moving the upper section 2 just after the power to bring the top edge 32 flush with the floor surface.

Referring now to the plate mechanism 5, this is essentially flat, elongated, and in plan is rectangular in shape and includes a plurality of serially arranged studs 50 which extend vertically upwardly. The studs are attached by conventional stud welding apparatus.

The studs are adapted to be received between the bends 40 and 41 which yieldably grip the same. Thus, the studs form connecting means which cooperate with the connector means of the side rails. For assembly purposes, whether in the factory or in the field, the preferable technique is to push the side rail down onto the plate mechanism to effect the engagement between bends 40 and 41 and the studs 50.

The plate mechanism takes several forms depending upon the type of trench.

In a full bottom or pan trench, the plate mechanism is rectangular in shape and is coextensive with the length of the side rail and extends between the side rails and slightly beyond same to provide space for securing the plate mechanism to the crests of the subfloor or to be anchored to a concrete subfloor. The studs on the plate mechanism are arranged as by two sets, one set serially spaced adjacent one edge of the plate mechanism and the other set serially spaced adjacent the opposite edge of the plate.

When the trench is the intermittent bottom type, the plate mechanism is also rectangular in shape and is partly coextensive with the length of the side rails and extends between and slightly outside the side rails similarly as the pan trenches. By being partially coextensive with the side rails, a single enlarged opening is created over the cellular raceway for use in accessing the openings in the power and communication ducts therein. The studs on the plate mechanism are arranged similarly in the pan or full bottom trench.

In a bottomless trench, the plate mechanism takes the forms of two narrow rectangular shaped strips respectively under the side rails and extending coextensive therewith. Each strip has a plurality of studs serially spaced along the strips. Each strip is adapted to be secured to the crests of a metal subfloor or anchored to a concrete subfloor and in the former case is provided with flanges which extend into the valleys and prevent entry of concrete to the trench during the pour.

Returning now to the connector means of the side rails and the connector means of the plate mechanism, the advantage of the connector structure will now be commented on.

First, the side rail and plate mechanism can be assembled as by relatively moving the rail and stud in a direction normal to the axis of the stud. For example, as noted heretofore by pushing the rail down on the plate mechanism which is made possible by the bends 40 and 41 sliding down over the studs 50. It will be understood, of course, that where an assembly of covers and side rails is to be placed on the plate mechanism, the side rails are simultaneously moved down over the respective studs.

Second, when the side rail is mounted on the plate mechanism, the side rail and plate mechanism can be relatively moved in a direction along the axis of the side rail, for example, if the plate mechanism is fixed on a subfloor either end of the side rail can be tapped to nudge the rail along the studs. An assembly of side rails and covers can be axially moved by placing a block over the end of the trench and tapping the center of the block.

Thirdly, the side rail and plate mechanism can be separated by relatively moving the rail and plate mechanism apart, for example, if the plate mechanism is fixed on a subfloor, the side rail is pryed with the upward motion being accomodated by the bends 40 and 41 sliding upwardly along the studs.

In connection with FIGS. 4 and 5, we have illustrated, for descriptive purposes, the openings 33 and 45 as being side by side. Usually, in a trench cover these openings would be spaced apart by that the openings 45 for adjusting screws are located centrally of the cover and the openings 45 for hold down screws are located at the corners of the covers.

With the above in mind, the various forms of the trench will now be commented on.

Referring to FIG. 1, a typical subfloor comprises corrugated decking 51 and cellular raceways 52 which are blended together in the usual manner. The cellular raceways 52 have power raceway or cell 53, carry power conductors 54, and on opposite sides have telephone or other communication raceways 55 and carrying cables 56. In each cellular raceway, access to power raceway 53 is provided by the access opening 60 and access to the telephone raceways 55 is provided by the access openings 61.

The power conductors and communication cables in the cellular raceways are serviced by intermittent bottom trenches, three of which are illustrated at 62, 63, and 64. The trench 62 is installed on the subfloor when the trenches 63 and 64 are above the floor ready for installation.

The trenches 62, 63, and 64 are the custom engineered kind being shipped to the job site fully assembled and ready for installation. The trenches 62, 63, and 64 as shown are identical in construction having side rial, cover, and plate mechanism components as previously described. Thus, the trench 64 has side rails 65 and 66 mounted on plate mechanism 67. Covers 68 are supported on the side rails. The same numbers as on trench 64 have been applied to the corresponding parts of the trenches 62 and 63.

It will be observed that the plate mechanism 67 extends only partially along the length of the side rails so as to create a large opening. This opening extends from the edge 67a of the plate mechanism to the left hand end of the trench and also extends between the two side rails 65 and 66. The length of the opening is commensurate with the width of the cellular raceway.

Referring to FIG. 10, the side rail 65 of trench 64 has the upper section 69 and lower section 70 joined together by adjusting means 71 which are identical in construction to the upper section 2, lower section 3, and adjusting means 3 previously described. The side rail 66 is similarly constructed. The plate mechanism 67 is same as previously described.

It will be observed that the plate mechanism 67 extends between the side rails and slightly outwardly thereof so as to provide area for securing the plate mechanism to the crests of the decking 51.

Due to the opening over the cellular raceway, it is necessary to provide means to prevent the entry of wet concrete into the trench during the pour. Thus, a pair of closure means 72 are provided which are disposed underneath the opposite side rails and along the enlarged opening. An enlarged view of the closure is shown in FIG. 6. Each closure includes a narrow top strip 73 supported on the crests of the raceway and flanges 74 which extend down into the valleys of the raceway.

The typical procedure for installing a plurality of trenches such as 62, 63, etc. is commented on below.

First, chalk lines are put down along the crests of the subfloor along the trench run and then pairs of closure means 72 are installed on the cellular raceways usually by tack welding.

The first intermittent trench, say the trench 62, is set down on the subfloor. This trench may, for example, be adjacent a wall having feeder arrangement such as a vertical riser. The plate mechanism is then secured by self-tapping screws in the decking portion or by tack-welding in the crests. The next trench, such as trench 63, is then put into position. This is done as just described.

For lining up the side rails of the trench 63 with the side rails of the trench 62 an arrangement other than the use of a coupling (FIG. 7) is employed. This is done by off-setting the lower section of the side rail with respect to the upper section of the side rail which permits the outboard end of the lower section on one trench to fill the void created by shifting of the lower section of the adjacent trench. The foregoing will be explained in connection with FIGS. 8 and 9.

Figure 8:
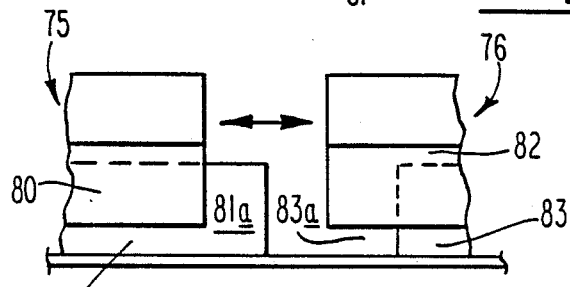
FIGS. 8 and 9 are respectively fragmentary elevational views illustrating the coupling or aligning of abutting ends of adjacent side rails without the use of a coupler such as shown in FIG. 7.
Figure 9:
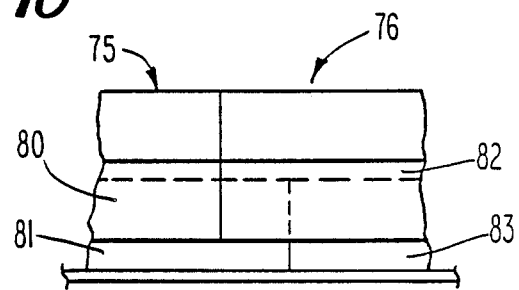

In FIGS. 8 and 9 the left hand trench has side rail 75 and the right hand trench has side rail 76. The side rail 75 comprises the upper section 80 and lower section 81 while the side rail 76 comprises the upper section 82 and lower section 83.

In the left hand trench, the lower section 81 is off-set to the right with respect to the upper section 80 so that the lower section has an outboard part 81a. In the right hand trench, the lower section 83 has also been shifted to the right with respect to the upper section 82 and this shifting creates an inboard space 83a which is of the same axial length as the outboard portion 81a.

It will be evident that when the trenches are moved as noted in FIG. 9, the outboard end 81a will occupy the inboard space 83a. This aligns the abutting side rails. The same takes place on the opposite side of the trench for the two adjacent side rails.

Returning now to FIG. 1, after the trench 63 has been placed down on the subfloor, the same is nudged to the left so that the outboard section of the side rails of trench 62 fit into the inboard space of the side rails of trench 63. When the trench 63 is fully positioned, the plate mechanism is secured to the subfloor as by self-tapping screws or spot welds. The same procedure is applied to the trench 64, etc., etc.

The trenches 62, 63, and 64 are shown with three covers. Additional covers are employed for longer length trenches, such as full bottom trench 84. In general, the length and number of covers depends on the width and the spacing between the raceways 52.

The trench 84 is of the type which is fully assembled at the factory and shipped to the job already for installation. The trench 84 includes the side rails 85 and 86, the covers 90, and plate mechanism 91. These components have the same construction as corresponding components described in connection with FIGS. 1, 3, and 4. A cross section through the trench of FIG. 2, when mounted on a metal subfloor and taken on the lines 92 would produce a cross section identical to that of FIG. 10.

Abutting trenches of the kind shown in FIG. 2 usually are aligned by means of the coupler 23 of FIG. 7. This is done by removing the end cover of the trench secured to the subfloor and then fully inserting the key arm 22 of a coupler into the slor 16 in each of the side rails. The next trench, with its end cover removed, is brought into abutting position and the installed couplers shifted so that the key arms are inserted into the side rail slots. The screws 93 are then tightened up. Additional screws may be employed if desired.

The bottomless trench employs the same kind of cover and side rails as described heretofore. The plate mechanism differs in that it does not extend between the side rails. With this in mind we will now comment on the bottomless trench.

Referring to FIG. 11, the bottomless trench 94 includes the side rails 95 and 96 and cover 97. The side rail 95 has the upper section 100 and lower section 101 joined together by adjusting mechanism 102. The components are the same as described in connection with FIGS. 1, 4, and 5.

The plate mechanism 103 comprises two strips like elements 104 and 105 respectively disposed under the side rails 95 and 96. The element 104 is shown in FIG. 12 and includes the elongated narrow top 106 carrying the studs 107 and extending down from the top 106 are the flanges 108.

For installation purposes on a metal subfloor, the plate mechanism; i.e. strips 104 and 105 are placed down on a subfloor so that an adjacent pair of the flanges 108 occupy the valleys of a cellular raceway similarly as described for the flange 74 of closure 72 of FIG. 6. The remaining flanges 108 occupy the valleys in the decking or another cellular raceway. It will be noted that the end flanges 108a are half-size. This is done so that the two adjacent half-size end flanges will fully occupy a valley.

The length of the strips 104 and 105 member of flange 108 and the number of flanges will depend on the particular length of side rails.

With respect to mounting the pan and bottomless trenches on a concrete subfloor, this is accomplished by supporting the plate mechanism on the usual leveling and/or securing deviced employed for conventional pan and bottomless trench.

From the foregoing description, it will now be readily apparent that, as mentioned heretofore, the structure of the components permits factory or on-the-job installation and the option as to type of trench simply by choice of dimensions.

By way of example, FIG. 8 illustrates an inventory of parts of FIG. 3 for factory assembly or field assembly of the pan trench of FIG. 2. (In FIG. 3 the corresponding parts have the same number.) This inventory normally would include side rail and plate mechanism components for intermittent and bottomless trench.

As previously mentioned, the structure of the side rails and plate mechanism permits removal of the trench when presence of same is no longer desired in a floor.

We have already discussed the fact that the side rails can be separated from the plate mechanism. Further, in this regard, note with reference to FIGS. 4 and 5 that the design avoids any outside proturbance which might lock into the concrete and prevent removal.

For removal purposes, the covers are taken off and then a tool inserted between the concrete and each side rail to be sure the rail is free from the concrete. Each side rail is then pryed up and away from the plate mechanism.

We claim:

1. In a trench duct:
   first and second elongated spaced-apart side rails each side rail having opposite ends; cover means mounted on said side rails; plate mechanism for mounting the trench duct over a subfloor; and
   each said side rail having an upper section and a lower section, the upper section having a pair of spaced-apart downwardly extending legs with the lower section being disposed between the legs and the lower section being connected to said plate mechanism and the upper section and the lower section being axially off-set so that on one end of the side rail the upper section extends outwardly of the lower section and on the opposite end of the side rail the upper section extends inwardly of the lower section.

2. A pan trench duct comprising:
   first and second elongated, spaced-apart side rails, cover means and an elongated, rectangular-shaped plate mechanism for mounting the trench duct over a subfloor each side rail having opposite ends;
   each said side rail comprising an upper section having means mounting said cover means, a lower section, and adjusting means mounting the upper section on the lower section for vertically moving the upper section with respect to the lower section, the upper section having a pair of spaced-apart downwardly extending legs with the lower section being disposed between the legs and the lower section being joined to said plate mechanism;
   said plate mechanism extending between said side rails for use as the bottom of the pan trench duct; and
   in each side rail, the upper section and the lower section are axially off-set so that on one end of the side rail the upper section extends outwardly of the lower section and on the opposite end of the side rail the upper section extends inwardly of the lower section.

3. A side rail for a trench duct, the side rail having opposite ends and
   an upper section and a lower section; and
   the upper section having a pair of spaced-apart downwardly extending legs with the lower section being disposed between the legs and the upper section and the lower section being axially off-set so that on one end of the side rail the upper section extends outwardly of the lower section and on the opposite end of the side rail the upper section extends inwardly of the lower section.

* * * * *